(12) United States Patent
Miyazawa

(10) Patent No.: US 9,849,860 B2
(45) Date of Patent: Dec. 26, 2017

(54) KEYLESS ENTRY DEVICE

(71) Applicant: Alps Electric Co., Ltd., Ota-ku, Tokyo (JP)

(72) Inventor: Akira Miyazawa, Miyagi-ken (JP)

(73) Assignee: Alps Electric Co., Ltd., Tokyo (JP)

(*) Notice: Subject to any disclaimer, the term of this patent is extended or adjusted under 35 U.S.C. 154(b) by 0 days.

(21) Appl. No.: 15/406,464

(22) Filed: Jan. 13, 2017

(65) Prior Publication Data

US 2017/0129456 A1 May 11, 2017

Related U.S. Application Data

(63) Continuation of application No. PCT/JP2015/072460, filed on Aug. 7, 2015.

(30) Foreign Application Priority Data

Aug. 29, 2014 (JP) ................. 2014-176460

(51) Int. Cl.
| | |
|---|---|
| *G05B 19/00* | (2006.01) |
| *B60R 25/24* | (2013.01) |
| *E05B 49/00* | (2006.01) |
| *H04B 1/38* | (2015.01) |
| *H04B 1/59* | (2006.01) |
| *E05B 81/54* | (2014.01) |

(52) U.S. Cl.
CPC .............. *B60R 25/24* (2013.01); *E05B 49/00* (2013.01); *E05B 81/54* (2013.01); *H04B 1/38* (2013.01); *H04B 1/59* (2013.01)

(58) Field of Classification Search
None
See application file for complete search history.

(56) References Cited

FOREIGN PATENT DOCUMENTS

| JP | 2010-185186 | 8/2010 |
|---|---|---|
| JP | 2011-109589 | 6/2011 |

OTHER PUBLICATIONS

International Search Report dated Aug. 29, 2014 from PCT Application No. PCT/JP2015/072460.

*Primary Examiner* — Adolf Dsouza
(74) *Attorney, Agent, or Firm* — Beyer Law Group LLP

(57) ABSTRACT

A vehicle-side device includes a vehicle-side control unit that controls transmission of a request signal and performs predetermined control when authentication is successful on the basis of an answer signal, a portable device includes a portable-device control unit that detects reception intensity information of the request signal transmitted from the vehicle-side device and transmits an answer signal based on the reception intensity, the vehicle-side control unit controls a vehicle-side transmission unit so that the vehicle-side transmission unit transmits the request signal including the determination signal having an intensity level different for each section, and the vehicle-side control unit or the portable-device control unit determines whether or not the request signal is a true signal on the basis of a fluctuation in the reception intensity in each section of the determination signal received by the portable device.

18 Claims, 4 Drawing Sheets

KEYLESS ENTRY DEVICE

CLAIM OF PRIORITY

This application is a Continuation of International Application No. PCT/JP2015/072460 filed on Aug. 7, 2015, which claims benefit to Japanese Patent Application No. 2014-176460 filed on Aug. 29, 2014. The entire contents of each application noted above are hereby incorporated by reference.

BACKGROUND OF THE INVENTION

1. Field of the Invention

The present invention relates to a keyless entry device that performs predetermined control such as unlocking of doors of a vehicle by performing mutual communication between a vehicle-side device and a portable device.

2. Description of the Related Art

In a keyless entry device described in Japanese Unexamined Patent Application Publication No. 2010-185186, in order to prevent relay attack, a vehicle-side device transmits a request signal in which a signal intensity change is changed at a predetermined timing to a portable device, and the portable device detects whether or not there is a change point of signal intensity of the request signal, determines that a signal of which the change point is not detected is a fraudulent request signal, and does not transmit an answer signal.

Here, relay attack is performed by a first relay device arranged near a vehicle and a second relay device arranged at a position separated from the vehicle and performing wireless communication with the first relay device. That is, the first relay device receives an LF signal such as a request signal transmitted from a vehicle-side device near the vehicle, and transmits the signal to the second relay device, and the second relay device transmits an LF signal obtained by reproducing the signal. If a person holding the portable device approaches the second relay device, the portable device receives the LF signal from the second relay device. Here, in response to reception of a signal relayed by the two relay devices, the portable device transmits an answer signal composed of an RF signal. If the vehicle-side device receives this answer signal, the vehicle performs an unlocking operation in a place unintended by a user.

However, in recent years, a fraudulent relay device for relay attack has appeared as being capable of transmitting a request signal with an indication indicating whether or not there is an intensity change. Merely changing the signal intensity at a predetermined timing is insufficient to resolve relay attack.

SUMMARY OF THE INVENTION

Therefore, the present invention provides a keyless entry device capable of easily and reliably distinguishing between a request signal from a fraudulent relay device and a request signal transmitted from a true vehicle-side device.

According to an aspect of the prevent invention, there is provided a keyless entry device, including: a vehicle-side device provided in a vehicle and including a vehicle-side transmission unit that transmits a request signal, and a vehicle-side reception unit that receives an answer signal; and a portable device including a portable-device reception unit that receives the request signal, and a portable-device transmission unit that transmits the answer signal in response to the request signal, in which the vehicle-side device includes a vehicle-side control unit that controls transmission of the request signal and performs predetermined control when authentication is successful on the basis of the answer signal, the portable device includes a portable-device control unit that detects reception intensity information of the request signal transmitted from the vehicle-side device and transmits the answer signal based on the reception intensity, the vehicle-side control unit controls the vehicle-side transmission unit so that the vehicle-side transmission unit transmits the request signal including the determination signal having an intensity level different for each section, and the vehicle-side control unit or the portable-device control unit determines whether or not the request signal is a true signal on the basis of a fluctuation in the reception intensity in each section of the determination signal received by the portable device.

With this configuration, fluttering is caused in the reproduced signal by a fraudulent relay device, and the fluttering is detected in reception intensity change detection in the portable device. Thus, it is possible to determine whether or not the signal is a request signal from the fraudulent relay device. That is, in the fraudulent relay device for relay attack, if the reception intensity is low, reproducibility of the signal is poor, and fluttering is caused by fluctuation of the reproduced signal. Using this, in the present invention, the intensity levels are caused to be different among the sections, and thus, the reproduced signal fluctuates into a fluttering waveform particularly in a section in which the signal intensity is low among the sections in which reception intensity levels are different. Accordingly, since fluttering is easily caused in the signal from the fraudulent relay device, it is possible to discriminate a true request signal and a fraudulent request signal. Further, since the request signal has a plurality of intensity levels, it is possible to more reliably flutter the reproduced signal of the relay device, and to determine whether or not the request signal received by the portable device is a true signal even when reception intensity of the request signal and a total intensity level of a reproduced signal thereof in the relay device are changed according to a distance between the relay device and the vehicle-side device (for example, a signal attenuates and reception intensity of the relay device generally decreases as the distance increases).

In the keyless entry device of the present invention, it is preferable for the vehicle control unit or the portable-device control unit to calculate a reception intensity change rate in each section of the determination signal received by the portable device, and compare the reception intensity change rate with a threshold value to determine whether or not the request signal is a true signal. Further, in the keyless entry device of the present invention, it is preferable for the vehicle control unit or the portable-device control unit to calculate a time interval between change points at which the reception intensity of the determination signal received by the portable device changes above a predetermined level and compare the time interval with a threshold value to determine whether or not the request signal is a true signal.

With such a configuration, it is possible to accurately determine whether or not the request signal received by the portable device is true.

Here, fluttering of a signal cannot be detected merely by determining whether or not the signal intensity changes at a predetermined timing as in the related art. For fluttering of the signal, a request signal including a determination signal having a plurality of sections with different intensity levels is transmitted, an intensity change rate in each section of a received determination signal or a time interval between change points at which the intensity changes above a predetermined level is calculated, and the time interval is compared with a threshold value. Thus, it is possible to detect a fluctuation due to fluttering of a fraudulent reproduced signal.

In the keyless entry device of the present invention, it is preferable for the determination signal transmitted from the vehicle control unit to have at least a section with an intensity level higher than ½ of a maximum intensity level of the request signal and a section with an intensity level lower than ½ of the maximum intensity level.

Accordingly, even when reception intensity of the request signal and a total intensity level of a reproduced signal thereof in the relay device are changed according to a distance between the relay device and the vehicle-side device, it is possible to more reliably flutter the reproduced signal of the relay device, and to determine or not whether the request signal received by the portable device is a true signal.

According to the present invention, since the vehicle-side device transmits the request signal having a plurality of different intensity levels, and the vehicle-side control unit or the portable-device control unit determines whether or not the request signal is a true signal on the basis of a fluctuation in the reception intensity in each section of the determination signal received by the portable device, it is possible to easily distinguish between a request signal from a fraudulent relay device and a request signal transmitted from a true vehicle-side device.

Figure 3:
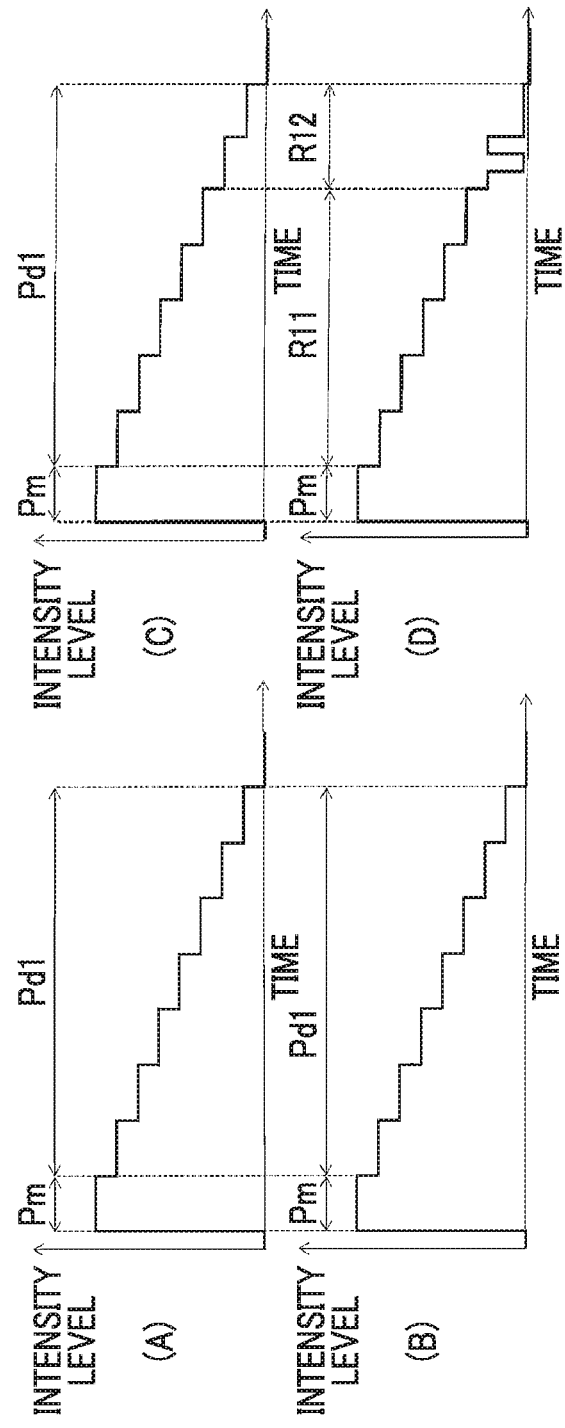
Figure 4:
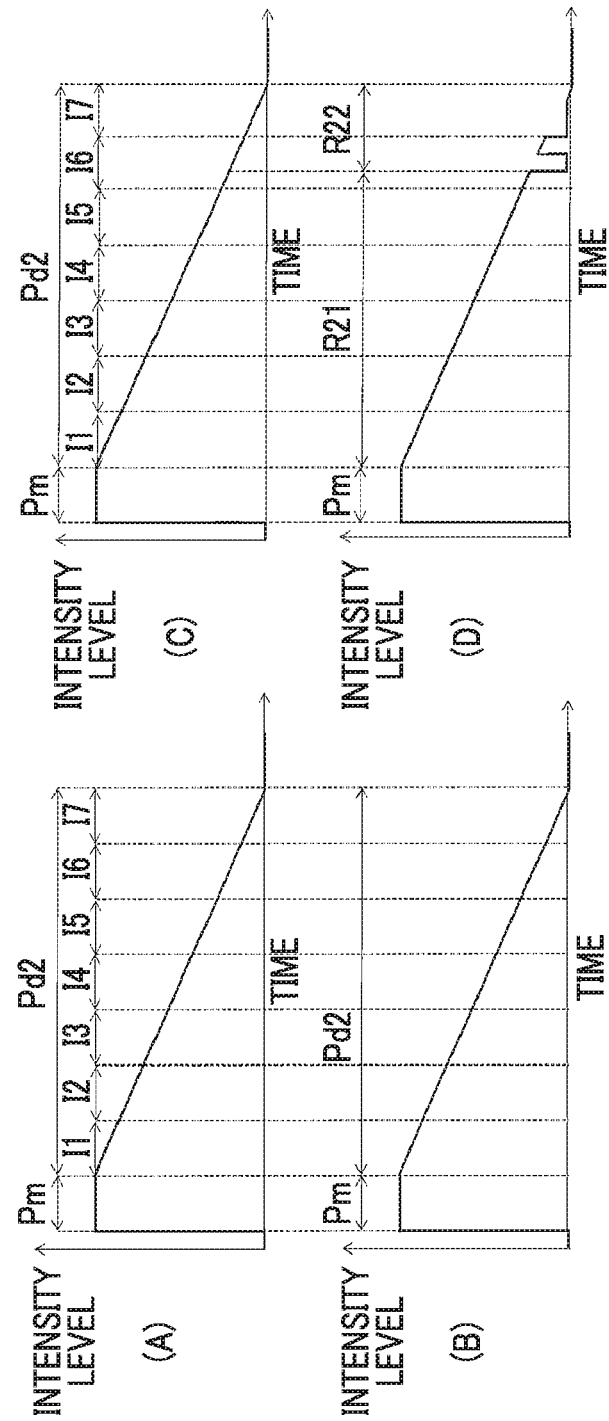

(A) and (C) of FIG. 3 are diagrams illustrating waveforms of a request signal in an embodiment of the present invention transmitted from a vehicle-side device, (B) is a diagram illustrating a waveform of a signal obtained by a portable device receiving the request signal of (A), and (D) is a diagram illustrating an example of a waveform of a fraudulent request signal transmitted from a fraudulent relay device that has received the request signal of (C); and (A) and (C) of FIG. 4 are diagrams illustrating waveforms of a request signal in a modification example of the embodiment of the present invention transmitted from a vehicle-side device, (B) is a diagram illustrating a waveform of a signal obtained by a portable device receiving the request signal of (A), and (D) is a diagram illustrating an example of a waveform of a fraudulent request signal transmitted from a fraudulent relay device that has received the request signal of (C).

DESCRIPTION OF THE PREFERRED EMBODIMENTS

Hereinafter, a keyless entry device according to an embodiment of the present invention will be described in detail with reference to the drawings.

Figure 1:
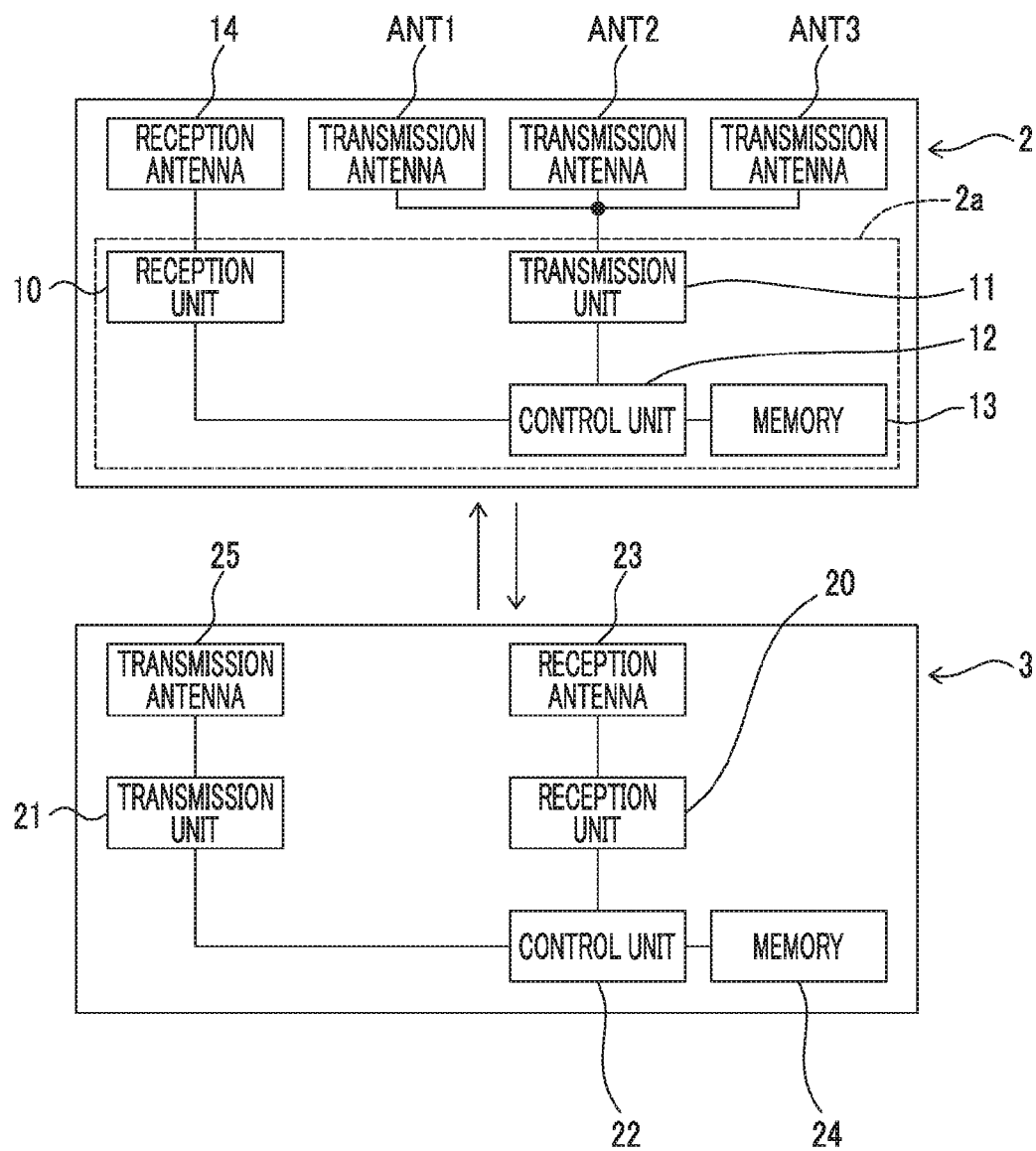
FIG. 1 is a block diagram illustrating a configuration of a keyless entry device according to an embodiment of the present invention.
Figure 2:
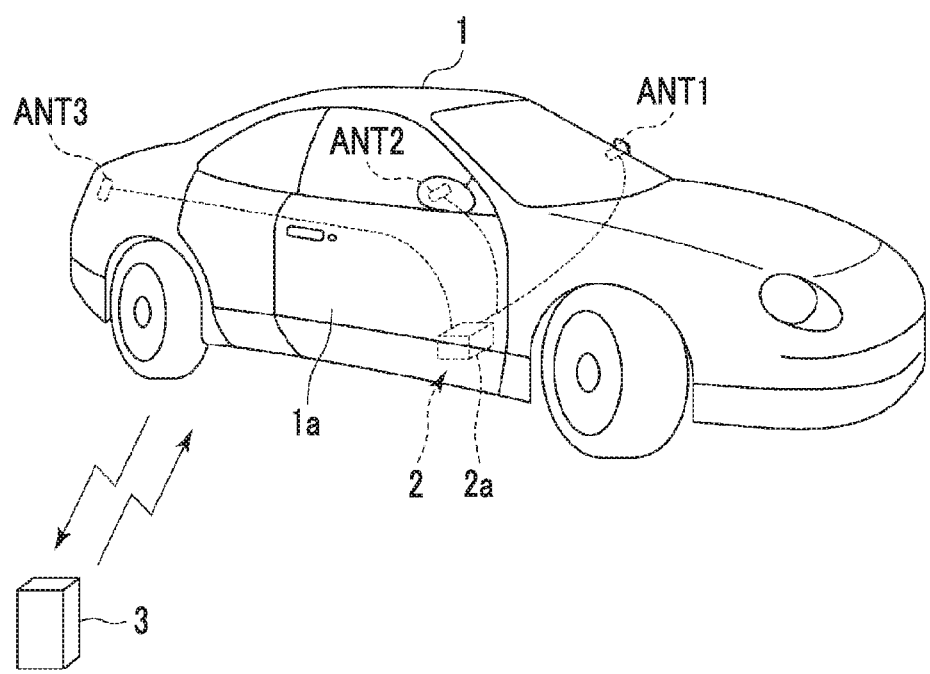
FIG. 2 is a perspective view illustrating a configuration of a vehicle-side device according to an embodiment of the present invention.

FIG. 1 is a block diagram illustrating a configuration of a keyless entry device according to this embodiment, and FIG. 2 is a perspective view illustrating a configuration of a vehicle-side device according to this embodiment. (A) and (C) of FIG. 3 are diagrams illustrating waveforms of a request signal in this embodiment that is transmitted from a vehicle-side device 2, (B) of FIG. 3 is a diagram illustrating a waveform of a signal obtained by receiving the request signal of (A) of FIG. 3 in a portable device 3, and (D) of FIG. 3 is a diagram illustrating an example of a waveform of an fraudulent request signal that is transmitted from a fraudulent relay device that has received the request signal of (C) of FIG. 3. FIG. 3 is a diagram illustrating portions of an intensity measurement signal and a determination signal among request signals. Further, in FIG. 3, in order to make description easier to understand, attenuation of a signal due to a distance between the vehicle-side device and the portable device or the relay device is not taken into consideration for illustration.

In the keyless entry device according to this embodiment, the vehicle-side device 2 is provided on the side of the vehicle 1 as illustrated in FIG. 2, and performs wireless communication with the portable device 3 that can be carried by a user to perform predetermined control of the vehicle 1, such as locking/unlocking of a door 1a.

As illustrated in FIG. 1, the vehicle-side device 2 includes an electronic control unit 2a arranged in the vehicle 1, a plurality of transmission antennas ANT1 to ANT3, and a reception antenna 14. The electronic control unit 2a includes a vehicle-side reception unit 10 (reception unit), a vehicle-side transmission unit 11 (transmission unit), a vehicle-side control unit 12 (control unit), and a memory 13.

The vehicle-side reception unit 10 receives a signal transmitted from the portable device 3, for example, an answer signal.

The vehicle-side transmission unit 11 transmits a signal such as a request signal to the portable device 3. The request signal output from the vehicle-side transmission unit 11 to the transmission antennas ANT1, ANT2, and ANT3 usually includes a wakeup signal, a synchronization signal, a command signal, and an intensity measurement signal. In this embodiment, a determination signal of which an intensity level is different for each section is added to the intensity measurement signal with certain intensity (signal intensity). Here, the determination signal has a plurality of intensity levels including at least an intensity level less than or equal to ½ of a maximum intensity level of the request signal. Further, the intensity measurement signal is used, for example, for calculation of a distance between the vehicle-side device 2 and the portable device 3 on the basis of the intensity received in the portable device 3.

An example of the request signal will be described with reference to FIG. 3.

The signals illustrated in (A) and (C) of FIG. 3 are examples of portions of the intensity measurement signal and the determination signal portion of a true request signal that is transmitted by the vehicle-side device 2. This request signal includes an intensity measurement signal Pm with constant intensity, and a subsequent stepwise determination signal Pd1. The determination signal Pd1 is a signal having a plurality of intensity levels that are different among stepwise sections, the intensity of which decreases by a constant amount in each constant period of time.

The signal illustrated in (B) of FIG. 3 indicates waveforms of signals of portions of the intensity measurement signal and the determination signal of the request signal obtained by the portable device 3 directly receiving the signal illustrated in (A) of FIG. 3 without passing through a fraudulent relay device. As can be seen from (A) and (B) of FIG. 3, in a case where the request signal transmitted from the vehicle-side device 2 is directly received by the portable device 3, a fluctuation in high signal intensity does not occur in the section for intensity levels in each section of the intensity measurement signal Pm and the determination signal Pd1.

The signal illustrated in (D) of FIG. 3 is an example of portions of the intensity measurement signal and the determination signal of a fraudulent request signal generated and transmitted by a fraudulent relay device that has received the signal illustrated in (C) of FIG. 3. In this signal, the intensity measurement signal Pm and the determination signal Pd1 in a range R11 in which the intensity level is high among the intensity measurement signal Pm and the determination signal Pd1 illustrated in (C) of FIG. 3 can be reproduced, but a signal in a range R12 in which the intensity level of the determination signal Pd1 is low fluctuates in the intensity level and does not decrease in a stepwise shape, and the determination signal Pd1 cannot be reproduced. This indicates that a low intensity signal among request signals transmitted from the vehicle-side device 2 cannot be accurately identified since reception sensitivity of the relay device is low, and thus, a reproduced signal from the relay device fluctuates. Therefore, since fluctuation occurs, particularly, at a low intensity level due to the determination signal having a different intensity in each section being included even when the relay device receives such a signal and the relay device cannot accurately generate a true request signal, it is easy to distinguish between the request signal from the relay device and the request signal transmitted from the true vehicle-side device 2 by detecting the fluctuation in each section of the determination signal. In this case, since the determination signal transmitted from the vehicle-side device 2 causes fluctuation due to fluttering in a reproduced signal of the relay device if the signal intensity in the section in which the signal intensity is lowest is signal intensity higher than zero and less than or equal to 50% of the intensity of the intensity measurement signal and, preferably, of 10 to 30% of the intensity measurement signal, it is possible to more reliably determine a true request signal.

A distance between the vehicle-side device 2 and the fraudulent relay device is not always constant. Since the determination signal transmitted from the vehicle-side device 2 has a plurality of sections with different intensity levels, for example, even when the distance is slightly long, all reception intensity levels of the request signal received by the relay device are shifted to a low side, and the relay device cannot receive an area in which the signal intensity of the determination signal is low at all, the relay device can receive a signal in any one of the sections, and fluctuation occurs due to fluttering when a section in which the signal intensity is low among reception sections is reproduced.

(A) and (C) of FIG. 4 are diagrams illustrating waveforms of portions of an intensity measurement signal and a determination signal of a request signal in a modification example of this embodiment, which is transmitted from the vehicle-side device 2, (B) of FIG. 4 is a diagram illustrating a waveform of a signal obtained by the portable device 3 receiving the signal in (A) and (D) of FIG. 3 is a diagram illustrating an example of a waveform of a portion of an intensity measurement signal and a determination signal of an fraudulent request signal that is transmitted from a fraudulent relay device that has received the request signal of (C) of FIG. 4. In FIG. 4, signal attenuation due to a distance between the vehicle-side device and the portable device or the relay device is not taken into consideration in order to make description easy to understand.

The request signals illustrated in (A) and (C) of FIG. 4 include an intensity measurement signal Pm with constant intensity and a slope-like determination signal Pd2 subsequent thereto. The determination signal Pd2 is a signal having a plurality of slope-like intensity levels, in which the intensity continuously decreases with time and reaches zero. In FIG. 4, sections I1, I2, I3, I4, I5, I6, and I7 are shown as examples of sections with different intensity levels.

The signal illustrated in (B) of FIG. 4 has the waveform of the request signal obtained by the portable device 3 directly receiving the request signal illustrated in (A) of FIG. 4 without via a fraudulent relay device. As can be seen from (A) and (B) of FIG. 4, in a case where the portable device 3 directly receives the request signal transmitted from the vehicle-side device 2, slopes of straight lines indicating fluctuation in intensity of the intensity measurement signal Pm and the determination signal Pd2 match, and significant fluctuation due to fluttering does not occurs in the signal waveform.

The signal illustrated in (D) of FIG. 4 is a fraudulent request signal generated and transmitted by a fraudulent relay device that has received the request signal illustrated in (C) of FIG. 4. In this signal, the intensity measurement signal Pm and the determination signal Pd2 in a range R21 in which the intensity level is high among the intensity measurement signal Pm and the determination signal Pd2 illustrated in (C) of FIG. 4 can be reproduced, but a signal in a range R22 in which the intensity level of the determination signal Pd2 is low fluctuates in the intensity level and does not decrease in a slope shape, and the determination signal Pd2 cannot be reproduced.

Although the examples of the request signal are illustrated in (A) and (C) of FIG. 3 and (A) and (C) of FIG. 4, the request signal is not limited thereto, and there are also the following modification examples of the request signal.

The request signal may include a determination signal which increases from a lowest level rather than the determination signal decreasing from an intensity level of the intensity measurement signal Pm to the lowest level, and a subsequent intensity measurement signal.

Further, it is preferable for the intensity level of the stepwise determination signal to change at regular intervals for a constant period of time as in this embodiment, but the constant period of time or the regular interval may not be used as long as a fluctuation in a level of each step can be detected.

Further, the determination signal may be arranged before and after the intensity measurement signal Pm, or the determination signal may be arranged between two intensity measurement signals.

An increase from a lowest level to the intensity level of the intensity measurement signal Pm or a decrease from the intensity level of the intensity measurement signal Pm to the lowest level in the request signal of (A) and (C) of FIG. 3 and the modification example may not be a monotonous increase or a monotonous decrease at certain intensity intervals or at certain time interval, or may be in a form in which the amount of increase/decrease in the intensity level or time changes midway. Further, a waveform may be adopted to be at a lowest level or the same intensity level as that of the intensity measurement signal in such an increase or a decrease in the intensity level. Further, in this case, the number of times of arrival at the lowest level may be plural.

Although the examples and the modification examples of the request signal in which the intensity measurement signal and the determination signal are continuous have been described in the above description, a period of time in which no signal is sent may be set between the intensity measurement signal and the determination signal.

The vehicle-side control unit 12 performs control of transmission of the request signal, control of an operation of the vehicle-side reception unit 10 and the vehicle-side transmission unit 11, a determination process or an authentication process based on the answer signal transmitted from the portable device 3, predetermined control of the vehicle 1 such as unlocking of the door 1a based on this authentication process, and the like.

The memory 13 stores an ID unique to a vehicle, IDs of a plurality of portable devices capable of operating one vehicle, or the like in advance.

A plurality of transmission antennas ANT1 to ANT3 for transmitting signals at a first frequency are connected to the vehicle-side transmission unit 11. The plurality of transmission antennas ANT1 to ANT3 are provided at respective places of the vehicle 1, such as at a plurality of doors or near the doors. Here, the first frequency is preferably a low frequency (LF) in a long wave region, such as 30 to 300 kHz. A very long wave region (VLF) may also be used. A reception antenna 14 for receiving a signal transmitted from the portable device 3 is connected to the vehicle-side reception unit 10.

As illustrated in FIG. 1, the portable device 3 includes a portable-device reception unit 20 (reception unit), a portable-device transmission unit 21 (transmission unit), a portable-device control unit 22 (control unit), a portable-device reception antenna (reception antenna) 23, a memory 24, and a portable-device transmission antenna (transmission antenna) 25.

The portable-device reception unit 20 receives a signal transmitted from the vehicle-side device 2, for example, a request signal.

The portable-device transmission unit 21 transmits a signal such as an answer signal corresponding to the request signal to the vehicle-side device 2. The answer signal includes information for transferring the fact that the request signal has been received to the vehicle-side device 2, ID information, information based on the reception intensity of the intensity measurement signal or the determination signal in the portable device 3, or the like.

The portable-device control unit 22 executes detection of intensity information of the request signal transmitted from the vehicle-side device 2, control of transmission of the answer signal, control of an operation of the portable-device reception unit 20 and the portable-device transmission unit 21, or the like. Further, the portable-device control unit 22 transmits an answer signal that is based on a determination process based on intensity information of the received request signal, or on the intensity information.

Here, a determination as to whether or not the request signal is a true signal may be performed by the vehicle-side control device on the basis of the answer signal.

The memory 24 stores intensity information of the request signal, the answer signal, an ID set for the portable device 3, an ID on the vehicle side, and the like in advance.

Further, a reception antenna 23 is connected to the portable-device reception unit 20. The reception antenna 23 is, for example, a triaxial antenna having directivity characteristics in three directions orthogonal to one another, and receives a signal at a first frequency transmitted from the vehicle-side transmission unit 11. A transmission antenna 25 is connected to the portable-device transmission unit 21. The transmission antenna 25 transmits a signal to the vehicle-side device 2 at a second frequency. Here, the second frequency is a frequency RF higher than the first frequency.

Next, mutual communication between the vehicle-side device 2 and the portable device 3 and predetermined control such as unlocking of doors of a vehicle will be described.

A request signal is periodically transmitted from the transmission antennas ANT1, ANT2, and ANT3. The request signal includes, for example, a signal of which the intensity changes in a stepwise manner as illustrated in FIG. 3 or a signal of which the intensity changes continuously as illustrated in FIG. 4 as the intensity measurement signal and the determination signal. The request signal is transmitted by the vehicle-side transmission unit 11 under the control of the vehicle-side control unit 12. Further, ID information set for the vehicle-side device 2 is also added to the request signal.

In the portable device 3, when the request signal is received, reception intensities of the measurement intensity signal and the determination signal are detected. In the portable-device control unit 22, distance information between the vehicle 1 and the portable device 3 is derived from the reception intensity information of the measurement intensity signal, and the distance information is added to information of the answer signal and transmitted to the vehicle-side device 2. From reception intensity information of the determination signal, it is determined whether or not the request signal is a true signal, and determination information is added to an answer signal and transmitted to the vehicle-side device 2. In the vehicle-side device 2, an authentication process is performed in the vehicle-side control unit 12 on the basis of the received answer signal. This authentication process is performed on the basis of (1) information on collation between an ID of the vehicle-side device 2 and a received ID of the portable device 3, (2) information on a determination as to whether or not the request signal is true, and (3) information based on the reception intensity of the measurement intensity signal of the portable device 3, such as information on a distance between the vehicle 1 and the portable device 3. Authentication is performed on the basis of information on a determination as to whether or not the portable device 3 approaches within a predetermined range from the vehicle 1. In a case where the authentication is successful as a result of the authentication process, a predetermined operation such as unlocking of doors of the vehicle 1 is executed. For example, in a case where the ID is authenticated, the request signal is determined to be a true signal, and the portable device approaches a predetermined distance, unlocking of the doors of the vehicle, or the like is executed.

In this case, in the portable-device control unit 22, when the request signal is determined not to be true, the answer signal itself may not be transmitted and unlocking of the doors of the vehicle, or the like may not be performed.

Further, the determination as to whether or not the request signal is a true signal may be performed in the vehicle-side device 2. In this case, information based on the reception intensity of the determination signal included in the request signal is added to the answer signal that is transmitted from the portable device 3 to the vehicle-side device 2. In the vehicle-side device 2, the vehicle-side control unit 12 determines whether or not the request signal is a true signal on the basis of the information based on the reception intensity of the determination signal added to the received answer signal. The authentication process is performed using information on this determination, distance information, and ID information, and if the authentication is successful, a predetermined operation such as unlocking of the doors of the vehicle is performed.

Next, the determination as to whether or not the request signal is true on the basis of information on the reception intensity of the determination signal will be described in detail.

For the determination as to whether or not the request signal is a true signal, when the request signal is a request signal of which the intensity of the determination signal changes stepwise, one step of the determination signal is set as one section, the reception intensity change rate in the section is calculated in each corresponding section of the determination signal received in the portable device 3, and the reception intensity change rate is compared with a predetermined threshold value so as to determine whether or not the request signal is a true signal. Here, the reception intensity change rate in the section is, for example, a value obtained by dividing a maximum value of the reception intensity in the section by a minimum value. In this case, for example, if the reception intensity change rate is higher than about 3 as the threshold value, it is determined that there is a fluctuation due to fluttering, and if the reception intensity change rate is lower than about 3, it is determined that the signal is a true signal in a range of variation due to noise or the like in a normal environment. The calculation of the reception intensity change rate may show a degree of fluctuation or fluttering of the signal in the section, and the present invention is not limited to this example. Further, the threshold value is appropriately set according to performance of the transmission unit or the reception unit, a configuration of the device, or the like.

Here, a time interval of change points at which the reception intensity of the determination signal changes above a predetermined level may be calculated and this time interval may be compared with a predetermined threshold value to determine whether or not the request signal is a true signal, instead of or in addition to the calculation of the reception intensity change rate in each section of the determination signal. This indicates that, if there is no fluctuation due to fluttering in the determination signal, a change point at which the reception intensity greatly changes is limited to a boundary portion between the sections, and accordingly, the time interval between the change points is substantially the same as a period of time of one section, whereas if there is a fluctuation due to fluttering in the determination signal, a large change point is generated in a portion other than a boundary between the sections, and the time interval between the change points becomes short, and accordingly, it is determined whether or not the request signal is true by identifying whether or not there are such large change points at short time intervals using the threshold value.

Here, the threshold value is set to be, for example, within a range of 90% to 100% of the time interval between the intervals of the determination signal, but is not limited to this example, and the threshold value is appropriately set according to performance of the transmission unit and the reception unit or a configuration of the device. For example, the intensity change rate or the time interval may be calculated for each step, and the request signal may be a fraudulent signal if there is a step out of the predetermined range.

Further, in a case where the determination signal is a signal of which intensity continuously changes as illustrated in (A) and (C) of FIG. 4, a determination as to whether or not the request signal is a true signal is performed by time-dividing reception intensity data by a predetermined time in reception intensity data in the portable device 3 of the determination signal, setting one divided range as one section (for example, section I1, I2, I3, I4, I5, I6, or I7), and calculating a reception intensity change rate in this section, comparing this reception intensity change rate with a predetermined threshold value. Here, the reception intensity change rate in the section is, for example, a value obtained by dividing a maximum value of the reception intensity in the section by a minimum value. If the reception intensity change rate is higher than the threshold value, it is determined that there is a fluctuation due to fluttering, and if the reception intensity change rate is lower than the threshold value, it is determined that the signal is a true signal in a range of variation due to noise or the like in a normal environment. The calculation of the reception intensity change rate may show a degree of fluctuation or fluttering of the signal in the section, and the present invention is not limited to this example. Further, the threshold value is appropriately set according to performance of the transmission unit or the reception unit, a configuration of the device, or the like.

As described above, with this configuration, the following effects are achieved according to the above embodiment.

The vehicle-side device 2 transmits the request signal including the determination signal of which the intensity level is different for each section, and the vehicle-side control unit 12 or the portable-device control unit 22 determines whether the request signal is a true signal on the basis of a fluctuation in the reception intensity in each section by the determination signal received by the portable device 3.

Accordingly, fluttering is caused in the reproduced signal by a fraudulent relay device, and the fluttering is detected in reception intensity change detection in the portable device 3. Thus, it is possible to determine whether or not the signal is a request signal from the fraudulent relay device. That is, in the fraudulent relay device for relay attack, if the reception intensity is low, reproducibility of the signal is poor, and fluttering is caused by fluctuation of the reproduced signal. Using this, in the present invention, the intensity levels are caused to be different among the sections, and thus, the reproduced signal fluctuates into a fluttering waveform particularly in a section in which the signal intensity is low among the sections in which reception intensity levels are different. Accordingly, since a fluctuation due to fluttering is easily caused in the signal from the fraudulent relay device, it is possible to discriminate a true request signal and a fraudulent request signal. Further, since the request signal has a plurality of intensity levels, it is possible to flutter the reproduced signal of the relay device and to determine whether the request signal received by the portable device 3 is a true signal even when reception intensity of the request signal and a total intensity level of a reproduced signal thereof in the relay device are changed according to a distance between the relay device and the vehicle-side device 2.

(2) The vehicle-side control unit 12 or the portable-device control unit 22 calculates a reception intensity change rate in each section of the determination signal received by the portable device 3, and compares the reception intensity change rate with a threshold value to determine whether or not the request signal is a true signal. Further, the vehicle-side control unit 12 or the portable-device control unit 22 calculates a time interval between change points at which the reception intensity of the determination signal received by the portable device 3 changes above a predetermined level and compares the time interval with a threshold value to determine whether or not the request signal is a true signal.

With this configuration, it is possible to accurately determine whether or not the received request signal is true.

(3) The determination signal transmitted from the vehicle-side control unit 12 has at least a section in which an intensity level is higher than a half of a maximum intensity level of the request signal and a section in which the intensity level is lower than a half of the maximum intensity level of the request signal.

Accordingly, even when reception intensity of the request signal and a total intensity level of a reproduced signal thereof in the relay device are changed according to a distance between the relay device and the vehicle-side device 2, it is possible to more reliably flutter the reproduced signal of the relay device, and to determine whether the request signal received by the portable device 3 is a true signal.

The present invention has been described with reference to the above embodiments, but the present invention is not limited to the above embodiments and can be improved or changed without departing from an object of the improvement or the scope of spirit of the present invention.

As described above, the keyless entry device according to the present invention is useful in that distinguishment between a request signal from a fraudulent relay device and a request signal transmitted from a true vehicle-side device can be easily performed.

It should be understood by those skilled in the art that various modifications, combinations, sub-combinations and alterations may occur depending on design requirements and other factors insofar as they are within the scope of the appended claims of the equivalents thereof.

What is claimed is:

1. A keyless entry device, comprising:
a vehicle-side device provided in a vehicle and including:
   a first transmission unit that transmits a request signal;
   a first reception unit that receives an answer signal; and
   a first control unit that controls the request signal transmitted from the first transmission unit, and performs predetermined control when authentication is successful on the basis of the answer signal received by the first reception unit; and
a portable device including:
   a second reception unit that receives the request signal;
   a second transmission unit that transmits the answer signal in response to the request signal; and
   a second control unit that detects reception intensity of the request signal received by the second reception unit, and controls the second transmission unit so as to transmit the answer signal based on the reception intensity of the request signal,
wherein the first control unit controls the first transmission unit such that the request signal includes a intensity measurement signal portion and a determination signal portion, the determination signal portion having a plurality of sections having different intensity levels,
and wherein the first control unit or the second control unit determines whether or not the request signal is a genuine signal which was sent directly from the vehicle-side device on the basis of a fluctuation in the reception intensity in at least one section of the determination signal portion in the request signal, calculates a rate of change in the reception intensity in each section of the determination signal portion in the request signal received by the portable device, and compares the rate of change in the reception intensity with a threshold value to determine whether or not the request signal is the genuine signal.

2. The keyless entry device according to claim 1, wherein the determination signal portion in the request signal transmitted from the first control unit has at least a first section with an intensity level higher than one half of a maximum intensity level of the request signal and a second section with an intensity level lower than the one half of the maximum intensity level.

3. The keyless entry device according to claim 1, wherein the first control unit or the second control unit determines the fluctuation in the reception intensity for each section of the determination signal portion.

4. The keyless entry device according to claim 1, wherein the first control unit or the second control unit determines that the received request signal is not genuine if the fluctuation in the reception intensity in one of the plurality of sections exceeds a predetermined threshold value.

5. The keyless entry device according to claim 1, wherein the intensity level of the plurality of sections in the determination signal portion gradually increases or decreases section by section in accordance with time sequence of the request signal.

6. The keyless entry device according to claim 1, wherein the determination signal portion is divided into the plurality of sections each having a predetermined time interval such that the intensity level of the determination signal portion changes at the predetermined time interval.

7. A keyless entry device, comprising:
a vehicle-side device provided in a vehicle and including:
   a first transmission unit that transmits a request signal;
   a first reception unit that receives an answer signal; and
   a first control unit that controls the request signal transmitted from the first transmission unit, and performs predetermined control when authentication is successful on the basis of the answer signal received by the first reception unit; and
a portable device including:
   a second reception unit that receives the request signal;
   a second transmission unit that transmits the answer signal in response to the request signal; and
   a second control unit that detects reception intensity of the request signal received by the second reception unit, and controls the second transmission unit so as to transmit the answer signal based on the reception intensity of the request signal,
wherein the first control unit controls the first transmission unit such that the request signal includes a intensity measurement signal portion and a determination signal portion, the determination signal portion having a plurality of sections having different intensity levels,
and wherein the first control unit or the second control unit determines whether or not the request signal is a genuine signal which was sent directly from the vehicle-side device on the basis of a fluctuation in the reception intensity in at least one section of the determination signal portion in the request signal, calculates a time interval between change points at which the reception intensity of the determination signal portion in the request signal received by the portable device changes more greatly than a predetermined extent, and compares the time interval with a predetermined value to determine whether or not the request signal is the genuine signal.

8. The keyless entry device according to claim 7, wherein the determination signal portion in the request signal transmitted from the first control unit has at least a first section with an intensity level higher than one half of a maximum intensity level of the request signal and a second section with an intensity level lower than the one half of the maximum intensity level.

9. The keyless entry device according to claim 7, wherein the first control unit or the second control unit determines the fluctuation in the reception intensity for each section of the determination signal portion.

10. The keyless entry device according to claim 7, wherein the first control unit or the second control unit determines that the received request signal is not genuine if the fluctuation in the reception intensity in one of the plurality of sections exceeds a predetermined threshold value.

11. The keyless entry device according to claim 7, wherein the intensity level of the plurality of sections in the determination signal portion gradually increases or decreases section by section in accordance with time sequence of the request signal.

12. The keyless entry device according to claim 7, wherein the determination signal portion is divided into the plurality of sections each having a predetermined time interval such that the intensity level of the determination signal portion changes at the predetermined time interval.

13. A keyless entry device, comprising:
a vehicle-side device provided in a vehicle and including:
  a first transmission unit that transmits a request signal;
  a first reception unit that receives an answer signal; and
  a first control unit that controls the request signal transmitted from the first transmission unit, and performs predetermined control when authentication is successful on the basis of the answer signal received by the first reception unit; and
a portable device including:
  a second reception unit that receives the request signal;
  a second transmission unit that transmits the answer signal in response to the request signal; and
  a second control unit that detects reception intensity of the request signal received by the second reception unit, and controls the second transmission unit so as to transmit the answer signal based on the reception intensity of the request signal,
wherein the first control unit controls the first transmission unit such that the request signal includes a intensity measurement signal portion and a determination signal portion, the determination signal portion having a plurality of sections having different intensity levels,
wherein the first control unit or the second control unit determines whether or not the request signal is a genuine signal which was sent directly from the vehicle-side device on the basis of a fluctuation in the reception intensity in at least one section of the determination signal portion in the request signal,
and wherein the answer signal includes information on the reception intensity of the determination signal portion of the request signal, whereby the first control unit determines if the request signal is the genuine signal based on the information on the reception intensity of the determination signal portion in the answer signal received from the portable device.

14. The keyless entry device according to claim 13, wherein the determination signal portion in the request signal transmitted from the first control unit has at least a first section with an intensity level higher than one half of a maximum intensity level of the request signal and a second section with an intensity level lower than the one half of the maximum intensity level.

15. The keyless entry device according to claim 13, wherein the first control unit or the second control unit determines the fluctuation in the reception intensity for each section of the determination signal portion.

16. The keyless entry device according to claim 13, wherein the first control unit or the second control unit determines that the received request signal is not genuine if the fluctuation in the reception intensity in one of the plurality of sections exceeds a predetermined threshold value.

17. The keyless entry device according to claim 13, wherein the intensity level of the plurality of sections in the determination signal portion gradually increases or decreases section by section in accordance with time sequence of the request signal.

18. The keyless entry device according to claim 13, wherein the determination signal portion is divided into the plurality of sections each having a predetermined time interval such that the intensity level of the determination signal portion changes at the predetermined time interval.

* * * * *